T. A. EDISON.
DUPLEX TELEGRAPH.
No. 180,858. Patented Aug. 8, 1876.
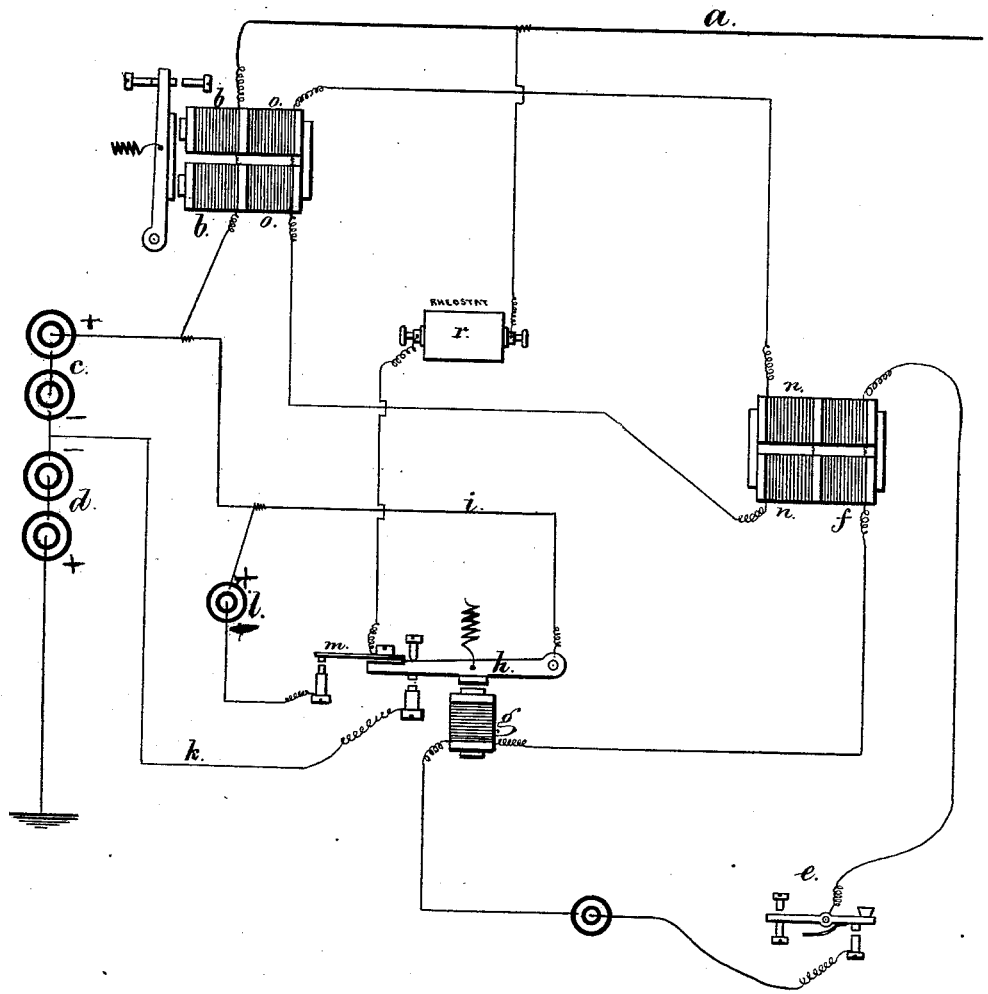
Witnesses
Chas H. Smith
Harold Serrell
Inventor
Thomas A. Edison
per L. W. Serrell
atty.

UNITED STATES PATENT OFFICE.

THOMAS A. EDISON, OF NEWARK, NEW JERSEY, ASSIGNOR OF ONE-HALF HIS RIGHT TO GEORGE B. PRESCOTT, OF NEW YORK CITY.

IMPROVEMENT IN DUPLEX TELEGRAPHS.

Specification forming part of Letters Patent No. 180,858, dated August 8, 1876; application filed September 1, 1874.

*To all whom it may concern:*

Be it known that I, THOMAS A. EDISON, of Newark, in the county of Essex and State of New Jersey, have invented an Improvement in Duplex Telegraphs, of which the following is a specification:

The main battery is in two parts connected in reverse in the line-circuit. In the same circuit is the receiving instrument or relay, to which is connected a local circuit and sounder. One-half of the battery is short-circuited at the sending-station by the depression of the key. Simultaneously with this depression a local circuit is closed and a reverse current sent from a battery through the receiving-magnet, and in that circuit is a rheostat that is adjusted so that the effect of the battery on the line is neutralized in the receiving-relay at the sending end; but the battery at this distant end is free to act at the receiving-station. At the same time the effects from the static charge in the line are neutralized in the receiving-instrument by induction.

In the diagram, $a$ is the line passing through the electro-magnet $b$ that operates a relay or sounder. The connection from $b$ is through the batteries $c$ $d$, or local circuit $i$ $l$ $k$, to the earth. The batteries $c$ and $d$ oppose each other, and, being equal, are not operative in $b$. The key $e$ is in a local circuit, in which are the helices $f$ $g$, and when the key is closed the electro-magnet $g$ attracts the armature and lever $h$, closing the circuit $i$ $k$ to the center of the batteries $c$ $d$, hence short-circuiting $c$, and allowing $d$ to act in the line. In order to compensate the action of the battery $d$ in $b$, the local battery $l$ is used, and the local circuit from $l$, through the insulated spring $m$ and rheostat to the line $a$, is closed simultaneously with the short-circuiting of $c$, and this rheostat $r$ is adjusted so that the action of $l$ in $b$ equals the action of $d$ in $b$, and, being in reverse, the forces are neutralized. The helices $f$ and $g$ being charged and discharged simultaneously, there is an inductive current set up in the core of $f$ and the helix $n$, and that gives a secondary charge to the helix $o$ that surrounds the core of $b$, and hence when $e$ is closed the secondary effect in $n$ neutralizes the static effect as the line is charged, and, as the circuit at the key $e$ is broken, a reverse induction-current is set up in $n$, neutralizing the discharge of the static charge of the line, the helices being wound so as to produce this reverse and neutralizing effect in the core of the electro-magnet $b$ of the helix $n$.

I claim as my invention—

1. The local equating-battery $l$, and rheostat $r$, connected to the line $a$, and to the receiving-magnet $b$, in combination with the batteries $c$ $d$, shunt $i$, and lever $h$, substantially as and for the purposes set forth.

2. The magnets $g$ and $f$, and induction-coils $n$ $o$, in combination with the magnet $b$, batteries $c$ $d$, and shunt-circuits, substantially as set forth.

Signed by me this 19th day of August, A. D. 1874.

THOS. A. EDISON.

Witnesses:
 GEO. T. PINCKNEY,
 CHAS. H. SMITH.